(12) United States Patent
Offer et al.

(10) Patent No.: US 6,191,379 B1
(45) Date of Patent: Feb. 20, 2001

(54) HEAT TREATMENT FOR WELD BEADS

(75) Inventors: Henry Peter Offer, Los Gatos, CA (US); Marshall Gordon Jones, Scotia, NY (US)

(73) Assignee: General Electric Company, Schenectady, NY (US)

( * ) Notice: Under 35 U.S.C. 154(b), the term of this patent shall be extended for 0 days.

(21) Appl. No.: 09/285,662

(22) Filed: Apr. 5, 1999

(51) Int. Cl.[7] .................................................. B23K 9/167
(52) U.S. Cl. ................ 219/75; 219/121.63; 219/121.64; 219/137 R
(58) Field of Search ............................ 219/137 R, 121.6, 219/121.63, 121.64, 136, 137 PS, 74, 75

(56) References Cited

U.S. PATENT DOCUMENTS

| | | | |
|---|---|---|---|
| 2,756,311 | * | 7/1956 | Persson et al. .......................... 219/74 |
| 4,136,273 | * | 1/1979 | Eujita et al. ............................ 219/75 |
| 4,143,260 | * | 3/1979 | Backstrom et al. ............. 219/137 R |
| 4,436,982 | * | 3/1984 | Kokura et al. ................. 219/137 PS |
| 4,507,540 | * | 3/1985 | Hamasaki ....................... 219/121.64 |
| 4,580,026 | * | 4/1986 | Stol ...................................... 219/136 |
| 4,681,396 | | 7/1987 | Jones . |
| 4,799,755 | | 1/1989 | Jones . |
| 5,125,558 | | 6/1992 | Jones et al. . |
| 5,408,065 | * | 4/1995 | Campbell et al. ................ 219/121.6 |
| 5,527,441 | | 6/1996 | Offer . |
| 5,670,072 | | 9/1997 | Offer et al. . |
| 5,714,735 | | 2/1998 | Offer . |
| 5,793,009 | | 8/1998 | Offer . |

FOREIGN PATENT DOCUMENTS

| | | | |
|---|---|---|---|
| 51-79654 | * | 7/1976 | (JP) ................................... 219/137 R |
| 54-54932 | * | 5/1979 | (JP) ................................... 219/137 R |
| 58-154460 | * | 9/1983 | (JP) ................................... 219/137 R |
| 61-3682 | * | 1/1986 | (JP) ................................... 219/137 R |
| 6-198472 | * | 7/1994 | (JP) ................................... 219/137 R |

OTHER PUBLICATIONS

Beyer et al, "New Aspects in Laser Welding with an Increased Efficiency," Proceedings of the Laser Materials Processing Conference ICALEO '94, LIA vol. 79, Oct. 17–20, 1994, pp: 183–192.

Steen, "Arc Augmented Laser Processing of Materials,"J. Appl. Phys. 51(11) Nov. 1980, pp. 5683–5641.

Alexander et al, "Arc–Augmented Laser Welding–Process Variables, Structure and Properties," The Joining of Metals, Spring Residential Conference, Coventry, Apr. 10–12, 1981, pp: 155–160.

Nagata et al, "Laser Welding Combined with TIG or MIG," IIW–Doc. IV–390–85, 1985, pp: 1–8.

Eboo et al, "Arc–Augmented Laser Welding," Advances in Welding Processes vol. 1, Paper 17, Harrogate, U.K., May 9–11, 1978, pp: 257–265.

Steen et al, "Arc Augmented Laser Welding," Metal Construction, 11, (7), Jul. 1979, pp: 332, 333, 335.

Johnson et al, "Laser/Plasma Technique Welds Sheet Metal," Industrial Laser Review, Nov. 1995, pp: 21–24.

Phillips et al, "Laser Beam Welding pf HY80 and HY100 Steels using Hot Welding Wire Addition," AWS and WRC Welding Research Supplement, Jun. 1992, pp: 201–s–208–s.

(List continued on next page.)

Primary Examiner—Clifford C. Shaw
(74) Attorney, Agent, or Firm—Marvin Snyder; Douglas E. Stoner

(57) ABSTRACT

Two parts are welded together at a weld spot in a groove. A spot adjacent the weld spot is heated simultaneously and independently of the welding so that the heating and welding form a heat-treated weld bead along the groove. Preheat treatment, postheat treatment, or both, may be used simultaneously with welding to maximize performance of the resulting weld joint. Preheat and postheat treatment may be performed using lasers while the welding may be performed by TIG welding or laser welding. The welding torch and preheat and postheat lasers are coplanarly aligned.

17 Claims, 4 Drawing Sheets

OTHER PUBLICATIONS

Okada et al, "Three–Electrode Welding Process," Trans. Japan Welding Society, vol. II, No. 1, Apr. 1980, pp: 35–42.

Filgas, "A 3 Kilowatt CW Nd: YAG Laser with Fiberoptic Multiplexing," Proceedings of the LIA Laser Materials Processing Conference, ICALEO '93, Oct. 1993, V. 77, pp: 323–327.

G. Notenboom et al., "Beam Delivery Technology in Nd:YAG Laser Processing", Proceedings of LAMP, '87, Osaka (May 1987), pp. 107–111.

* cited by examiner

HEAT TREATMENT FOR WELD BEADS

BACKGROUND OF THE INVENTION

This invention relates to welding, and, more specifically, to heat treating weld beads during the welding process.

Metal parts are commonly fixed together by welding, which involves locally melting the parts to effect a solidified weld joint or bead therebetween. Welding may be effected with or without a filler material at the weld joint.

Since the parent material or substrate is necessarily melted during welding, the metallurgical properties of the substrate are correspondingly affected. The affected region includes a heat-affected zone around the weld joint which, although not melted during the welding operation, nevertheless experiences a high temperature which alters the metallurgical properties of the parent metal material in that zone.

The parts may be formed of various metal alloys whose metallurgical properties and microstructures are affected differently at the weld bead and heat-affected zone. In some alloys, the material strength around the weld bead is reduced by the welding process which shortens the useful life of the welded parts by subjecting them to premature material cracking near the weld beads.

In order to improve the material properties at a weld joint, the parts may be preheated prior to welding, or they may be postheated after the welding, or both, to improve the microstructure and strength within the weld and the heat-affected zone of the weld.

The weld may be further improved by minimizing the amount of heat applied to the parts during welding and limiting the extent of the heated zone.

Various types of welding are known in the art and have different advantages and disadvantages. Some common examples include electrical arc welding, laser beam welding, and electron beam welding. Electrical arc welding has high heat input capability and is commonly used for welding relatively thick metal parts along a weld prep or groove which is filled using a welding filler material in multiple passes of overlying weld beads. The heat-affected zone is correspondingly relatively large.

Laser and electron beam welding are commonly used for limiting the extent of the heat-affected zone and effecting precise, narrow welds, with better control of the heat-affected zone.

Welding is further complicated by the nature of the welded parts and their intended use. For example, boiling water or pressurized water nuclear reactors include pressure vessels in which water is circulated for cooling the reactor core. The radioactive and high temperature environment is hostile and requires specialized metal alloys for the various components of the pressure vessels for obtaining enhanced useful lives.

Although corrosion resistant alloys are used in nuclear reactors of the type indicated above, they may nevertheless be subject to corrosion over their useful life which may be limited if stress corrosion cracking should occur. Stress corrosion cracking is a known problem in nuclear reactor components such as pipes exposed to high temperature water during operation. Stress corrosion cracking can be avoided by using special metal alloys and carefully controlled welding to limit residual stresses in, and thermal sensitization of, the weld.

Since the reactor pipes are generally thick-walled components, electrical arc welding with a suitable filler material is typically used for joining the pipes. The weld preps or grooves are preferably made as narrow as practical for minimizing the resulting heat-affected zone. Weld preheating and postheating may also be used for reducing undesirable microstructure changes near the weld bead. However, in view of the practical problems, including size, configuration, and available space for welding nuclear reactor components such as pipes, welding, preheating, and postheating are presently limited in their ability to produce optimum welds.

Accordingly, it would be desirable to provide an improved welding and heat treating process for improved weld performance.

BRIEF SUMMARY OF THE INVENTION

In a method of welding, two parts are welded together at a weld spot in a groove. A spot adjacent the weld spot is heated simultaneously and independently of the welding so that the heating and welding form a heat-treated weld bead along the groove. Preheat treatment, postheat treatment, or both may be used simultaneously with the welding to maximize performance of the resulting weld joint.

DETAILED DESCRIPTION OF THE INVENTION

Figure 1:
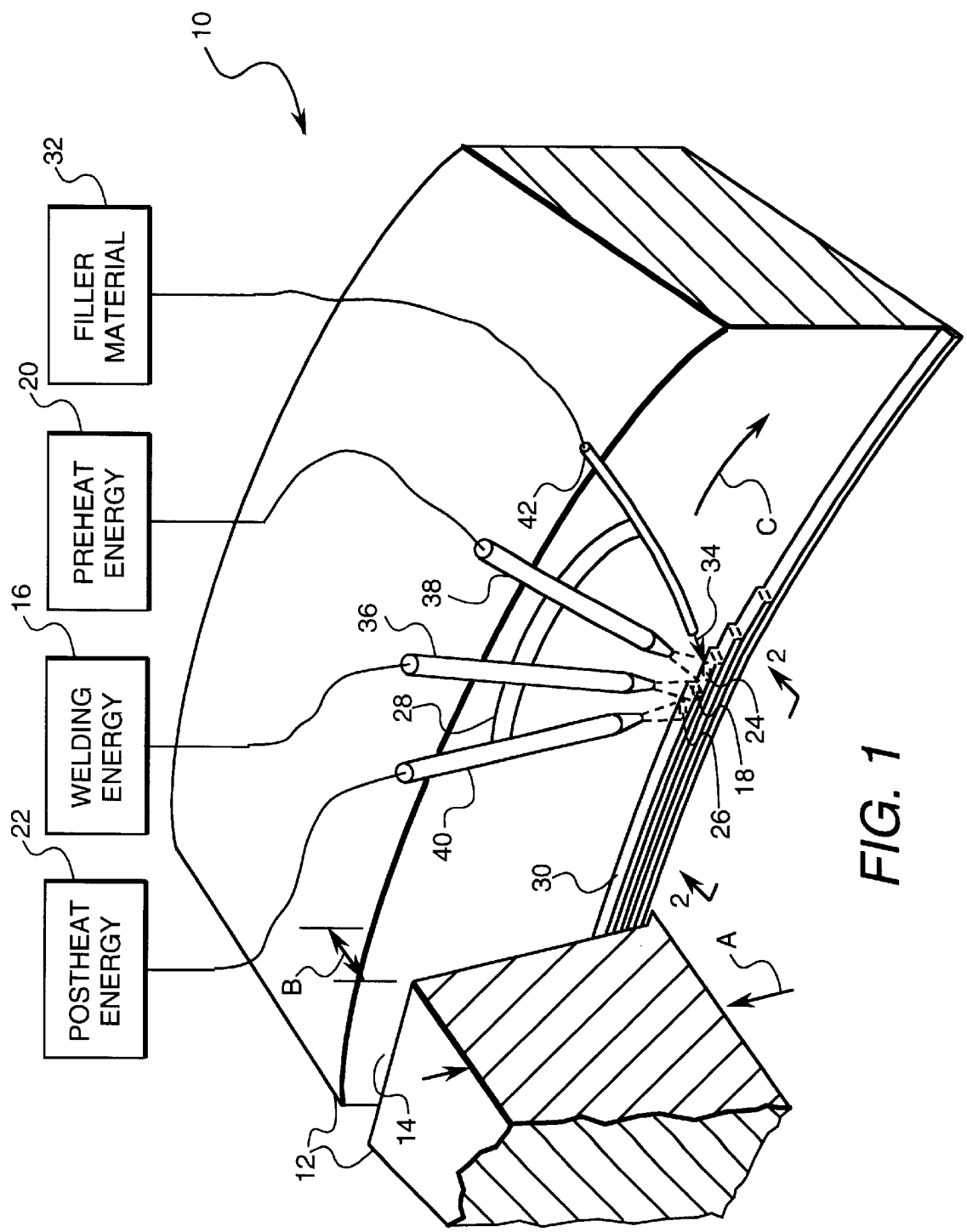
FIG. 1 is a schematic representation of a heat treating welding apparatus in accordance with an exemplary embodiment of the invention for welding two parts together along a groove therebetween.

FIG. 1 illustrates a heat treatment welder or welding apparatus 10 in accordance with an exemplary embodiment of the invention for welding together two workpieces or parts 12 at a weld prep or groove 14 between the parts. In the illustrated embodiment, the two parts 12 are thick-wall pipes formed of a metal alloy suitable for use in carrying high temperature water for a nuclear reactor, such as a boiling water reactor or pressurized water reactor, which exposes the water to radiation. The pipes are therefore subject to stress corrosion cracking for example, and the welding process for joining the pipes is controlled for minimizing stress corrosion cracking after welding, when the pipes are in use.

The two parts 12 typically have the same thickness A, which may be up to about 5 cm for example, and weld prep groove 14 may be conventional in form, with slightly tapered sidewalls extending radially inwardly to a small lower lip at which welding is commenced. In a preferred embodiment, groove 14 is narrow, with a width B substantially smaller than its depth, as represented by the part thickness A, thus effecting a high depth-to-width aspect ratio. The two parts are welded together along the entire depth and length of groove 14 in multiple passes.

More specifically, welder 10 includes means 16 for providing the requisite energy source (e.g., gas, electrical energy, or laser-produced coherent optical energy) for welding together the two parts 12 at a weld spot 18 initially at the bottom of groove 14. The weld spot defines a local melt pool between the two parts during welding, which solidifies to develop the resulting weld joint.

Additional energy supplying means 20,22 are provided for heating corresponding heat spots 24,26 adjacent weld spot 18 in the groove, each spot being heated simultaneously with, and independently of, the welding. Heating means 38,40 are not configured to weld, but instead are configured for providing local heat treatment near the weld spot to improve the metallurgical and mechanical properties adjacent the weld spot, including the weld microstructure itself.

A frame 28 is provided for colinearly aligning the welding means 36 and heating means 38,40 along groove 14 for allowing continuous welding and heating along the groove to form a continuous weld bead 30. Weld bead 30 is preferably deposited in layers to fill the entire groove 14 and form the resulting weld joint between the two parts 12.

A source of filler material 32 is provided for feeding a filler 34 of suitable material for matching the alloy material of the two parts 12. Filler 34 is deposited in the groove at weld spot 18 for melting by welding means 36 to form weld bead 30 upon solidification of the filler.

As shown in FIG. 1, welding means 36 comprises a welding torch, and heating means 20,22 comprises respective heating torches 38,40. Heating torches 38, 40 are offset from welding torch 36 for preferentially heating heat spots 24,26 to control temperature difference with weld spot 18 and thereby affect or determine the microstructure of the weld bead 30 being deposited.

As indicated above, it is conventionally known to provide preheating or postheating in a welding process for improving metallurgical properties of the resulting weld bead and adjoining heat-affected zone. However, preheat and postheat treatment are typically effected separately in time as permitted by the nature and configuration of the parts being welded, either before the welding starts, or after the entire weld bead is made.

In accordance with a preferred embodiment of the invention, preheat treatment, or postheat treatment, or both, may be simultaneously and independently effected as the welding process proceeds, for locally controlling the temperature difference between the weld spot and the adjacent material to improve the metallurgical properties and microstructure of the weld bead itself and its adjoining, heat-affected zone.

Welding means 36, preheating means 38, and postheating means 40 may be specifically configured to control the heating rate, cooling rate, and critical microstructure transformation temperatures of the local weld area in the immediate vicinity of weld spot 18. By controlling these rates and temperatures, including the capability to maintain the weld bead and adjacent heat-affected zone above a predetermined temperature for a minimum predetermined time, and by appropriate selection of the specific material composition or alloy, the microstructure and corresponding metallurgical properties of the weld bead and the heat-affected zone are therefore also controlled. Low alloy steels and chromium-molybdenum steels may be heat treated to advantage. For example, by controlling the cooling rate of the steels after welding, toughness, hardness, and cracking resistance in the weld joint can be improved.

Figure 2:
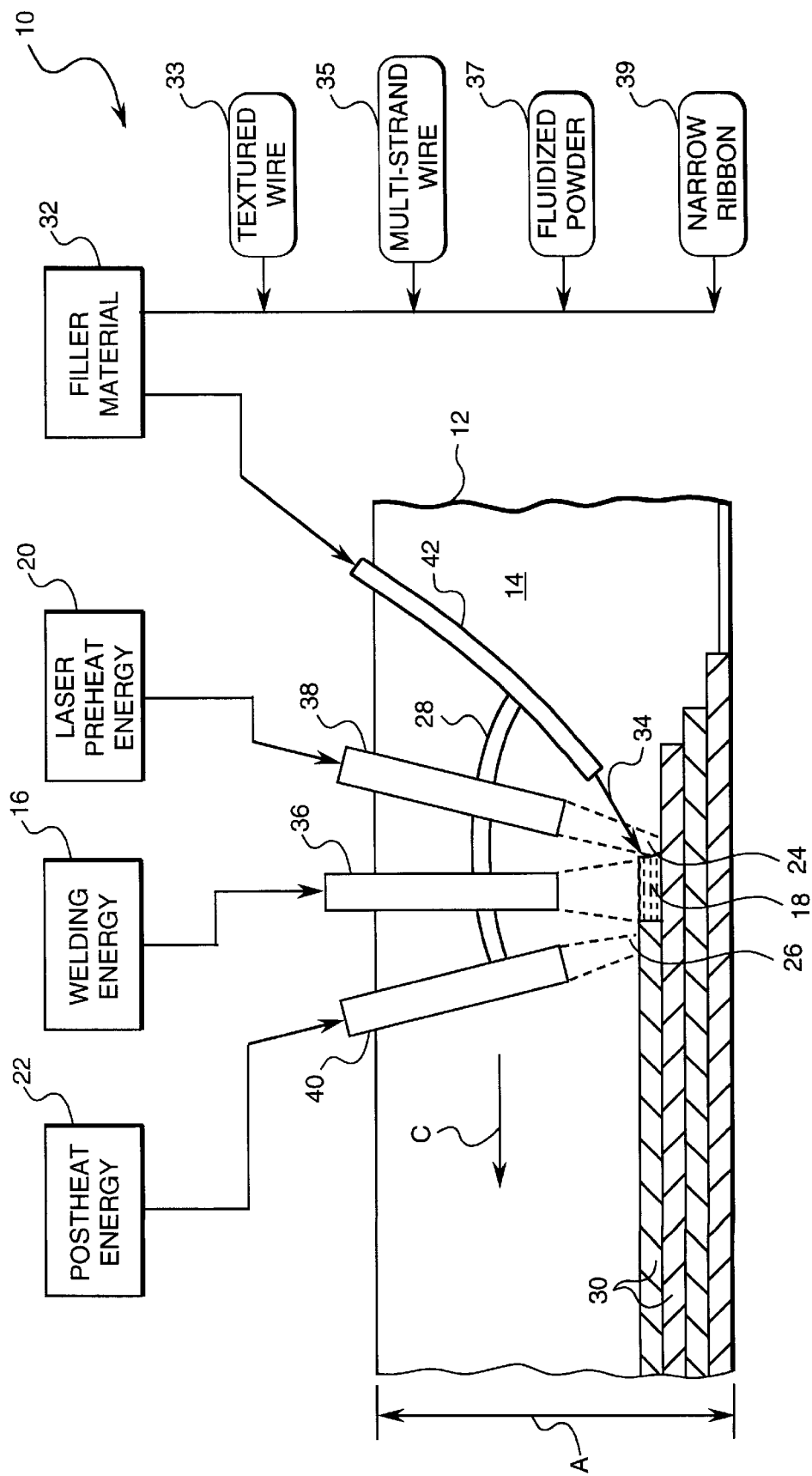
FIG. 2 is an elevational, schematic view of the welding apparatus illustrated in FIG. 1 and taken generally along line 2—2.

As shown in FIG. 2, preheating torch 38 is offset to lead in the travel direction C in advance of welding torch 36 along the groove, to preheat weld spot 18. Since weld bead 30 is formed by locally melting the two parts at weld spot 18 and adding filler 34 thereto, weld spot 18 necessarily travels in the direction C over preheat spot 24, which also travels simultaneously. The substrate, such as a previously-deposited layer of the deposited weld bead 30, is preheated at spot 24 immediately prior to being welded by torch 36 when weld spot 18 reaches the previously heated spot 24.

Preheat torch 38 may be operated to preheat the substrate at preheat spot 24, or it may be operated to preheat deposited filler 34, or both.

In the exemplary embodiment illustrated in FIG. 2, filler feeding means 42 may take any conventional form, such as a delivery tube joined to frame 28 and aligned with preheat torch 38 for preheating filler 34 discharged therefrom prior to being melted at weld spot 18. Filler 34 is selected in material composition to best complement the material composition of the parts being welded, and may, for example, be in the exemplary form of textured wire 33, multistrand wire 35, fluidized powder 37, or a narrow ribbon 39. Filler feeding means 42 may have any suitable configuration for delivering filler 34 in any of these forms to weld spot 18.

As also shown in FIG. 2, postheat torch 40 is offset to trail or follow welding torch 36 along groove 14 to postheat weld bead 30 at postheat spot 26. In this way, the cooling rate of the solidifying filler and substrate may be controlled, in turn controlling the metallurgical properties of deposited bead 30.

Preheating means 38 or postheating means 40 may be used along with welding means 36 in various embodiments. Alternatively, both preheating means 38 and postheating means 40 may be used simultaneously in conjunction with welding means 36. In this way, the substrate at weld spot 18 may be suitably preheated to an elevated temperature by preheat torch 38 prior to depositing the weld bead thereat. As the molten weld bead solidifies upon leaving the weld spot under the welding torch, it may be preferentially postheat-treated by postheat torch 40 for controlling its cooling rate.

Figure 3:
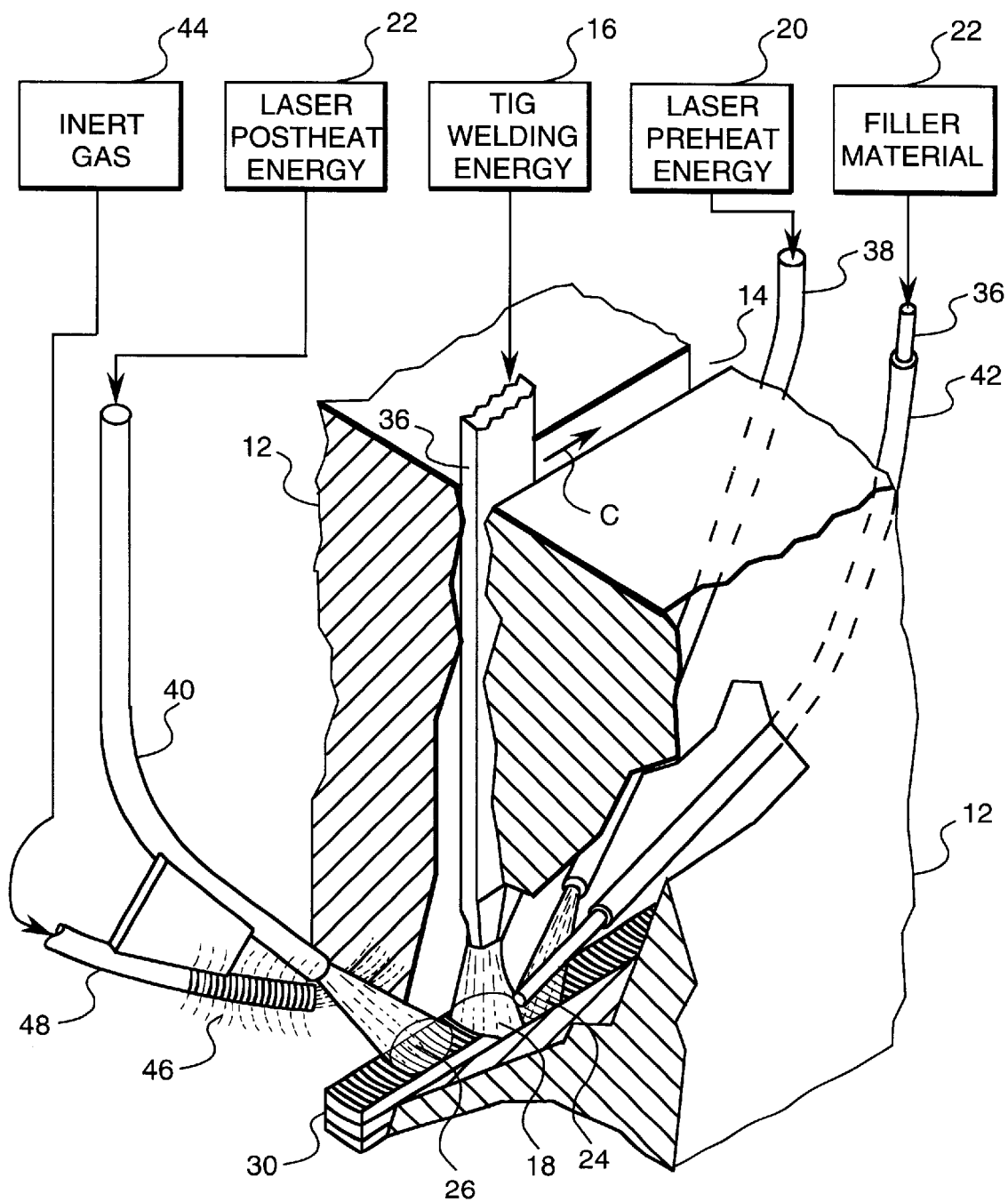
FIG. 3 is a schematic, isometric view of one embodiment of the welding apparatus illustrated in FIG. 2, configured with electrical arc welding and laser preheat and postheat.

The welding, preheating, and postheating means may take a conventional configuration for cooperating together. For example, FIG. 3 illustrates one embodiment wherein welding means 36 is a conventional tungsten inert gas (TIG) electrical arc welder torch. In this embodiment, welding torch 36 is in the form of an electrode suitably joined to a power supply 16 for striking and maintaining an electrical arc between the tip of the electrode and weld spot 18 for effecting welding at spot 18.

TIG welding torch 36 requires a suitable supply 44 of an inert gas 46, such as argon or helium, to be is delivered into groove 14 from the discharge end of a delivery tube 48. Inert gas 46 protects deposited weld bead 30 as it solidifies, preventing degradation of the weld bead material properties.

Preheating means 38 and postheating means 40 may comprise conventional lasers, i.e., laser torches, which may utilize simple optical fibers for delivering corresponding laser beams to preheat and postheat spots 24 and 26, respectively.

In a preferred embodiment, lasers 38,40 are neodymium:yttrium-aluminum-garnet (Nd:YAG) lasers which deliver corresponding laser beams through optical fibers to the weld area. These lasers cooperate with TIG welding torch 36 in an assembly referred to as a LaserArc system. The LaserArc system is a hybrid that can be used efficiently for various types of brazing and welding including joining, buildup, cladding, and combinations thereof, and can be tailored to function with either gas or solid state lasers combined with consumable electrode welding, or non-consumable electrode brazing and arc-welding processes.

The LaserArc system has relatively high thermal capacity and efficiency and effectively utilizes relatively lower power lasers, up to about 1 Kw for example, with the higher energy TIG welder used for achieving the required total laser and arc heating power level which typically exceeds 1 Kw. The cost per kilowatt of power delivered to the welded parts is significantly less with an electric arc than a laser beam, while the laser allows greater control of energy density and beam shape than an electric arc welder. This high capacity and efficiency of the hybrid combination of electric arc welding and laser heat treatment makes the LaserArc system collectively more cost effective and productive than either process alone.

The LaserArc system may be operated in many configurations. For example, the laser beam may be used to preheat the substrate material ahead of the molten weld pool, with the electric arc melting the filler material and the substrate material. The laser beam may preheat the filler material near the molten pool, with the electrical arc melting the filler material and substrate. The electrical arc may melt both the filler and substrate materials, with the laser beam postheat treating the solidified and adjacent material. Other combinations of melting, preheating, and postheating may alternatively be effected.

Figure 4:
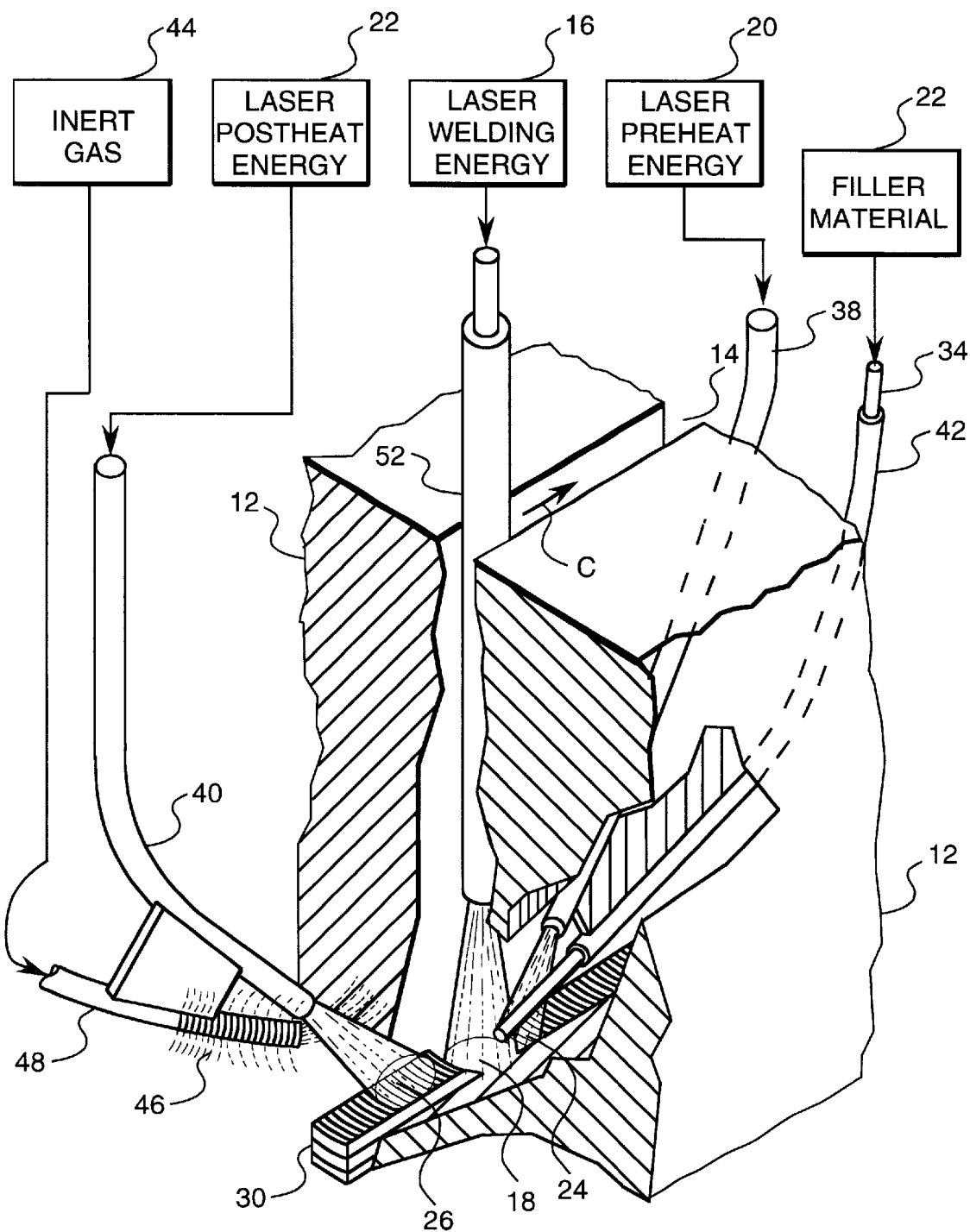
FIG. 4 is a schematic, isometric view of another embodiment of the welding apparatus illustrated in FIG. 2, configured with laser welding and laser preheat and postheat.

FIG. 4 illustrates an alternative embodiment of the invention wherein welding means 36 are in the form of a laser torch 52 which may utilize an optical fiber for delivering a laser welding beam. The laser may comprise a Nd:YAG laser having sufficient power to deliver its beam through the optical fiber for effecting welding at weld spot 18. In this embodiment, welding torch 52, preheat torch 38, and postheat torch 40 all deliver laser beams in a combined assembly referred to as a LaserLine system.

Both TIG welding torch 36 of the FIG. 3 LaserArc embodiment and laser torch 52 of the FIG. 4 LaserLine embodiment are specifically configured for providing sufficient welding heat to melt the substrate and filler material for welding. Additionally, inert gas 46 may be suitably channeled to corresponding weld spots 18 for protecting the solidifying weld material.

The preheat and postheat laser 38 and 40, respectively, in both the LaserArc and LaserLine systems are relatively low power and preferably configured with insufficient energy for melting the substrate material. Their purpose is limited to preheating and postheating for controlling the metallurgical properties of the resulting weld bead and heat-affected zone. The preheat and postheat lasers may, however, provide sufficient energy for melting the filler if desired.

The LaserLine system illustrated in FIG. 4 may be configured for preheating the substrate material ahead of the molten weld pool, with primary laser 52 melting both the filler and substrate materials. Alternatively, preheat laser 38 may preheat the filler before it enters the molten pool, with welding laser 50 melting both the filler and substrate materials, or postheat laser 22 may postheat-treat the solidified and adjacent weld material beyond the molten pool, with welding laser 50 melting both the filler and substrate materials. Alternatively, other combinations of melting, preheating, and postheating may be effected.

An additional advantage of both the LaserArc and LaserLine welders described above include the ability to maintain a relatively thin collective profile to allow insertion deep within high aspect ratio groove 14 for welding together the two parts in successive layers of weld beads 30 until groove 14 is completely filled.

As shown in FIG. 3, LaserArc electrode torch 36 may be elongate and flat in cross section for fitting within the narrow groove 14 and carrying sufficient electrical current for generating an electrical arc for welding within groove 14. The optical fibers for the preheat and postheat lasers 38 and 40, respectively, may also be relatively narrow in diameter. Filler tube 42 and gas tube 48 may also have small diameters, so that all these components can fit within the narrow width of groove 14 and be coplanarly aligned therein. The corresponding power supplies 16, 20, and 22 filler supply 32, and gas supply 44 may be located remotely from, and outside, groove 14.

The LaserLine system illustrated in FIG. 4 may be similarly configured in a small thickness assembly of components aligned coplanar with each other for being inserted within narrow groove 14 between the parts being welded.

The LaserArc and LaserLine welding systems can provide improvements in thermal efficiency, joint quality, metallurgical property, residual stress, and process productivity, which cannot be obtained by conventional laser beam welding, electrical arc welding, or brazing processes, when used alone. Moreover, these systems permit local preheating and local postheating in the direct vicinity of the welding zone as the weld bead is formed, for locally controlling the metallurgical properties of the weld bead and its heat-affected zone. This provides advantages over conventional preheating of parts prior to welding, or postheating of the parts after completion of the entire weld joint.

While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. A method of welding together two parts at a groove therebetween comprising:
    welding together said two parts at a weld spot in said groove;
    heating a heat spot adjacent said weld spot in said groove simultaneously and independently of said welding;
    continuing said welding and heating along said groove to form a weld bead therealong;
    feeding a filler into said groove at said weld spot to form said weld bead;
    preferentially heating said heat spot to control temperature difference with said weld spot to determine microstructure of said weld bead,
    wherein said heating preheats said filler.

2. A method according to claim 1 wherein said welding comprises electrical arc welding.

3. A method according to claim 1 wherein said welding comprises laser welding.

4. A method according to claim 1 wherein said heating comprises laser heating.

5. A method of welding together two parts at a groove therebetween comprising:
    welding together said two parts at a weld spot in said groove;
    heating a heat spot adjacent said weld spot in said groove simultaneously and independently of said welding;
    continuing said welding and heating alone said groove to form a weld bead therealong;
    feeding a filler into said groove at said weld spot to form said weld bead; and
    preferentially heating said heat spot to control temperature difference with said weld spot to determine microstructure of said weld bead, wherein said heating trails said welding along said groove to postheat said weld bead.

6. A method according to claim 5 wherein said welding comprises electrical arc welding.

7. A method according to claim 5 wherein said welding comprises laser welding.

8. A method according to claim 5 wherein said heating comprises laser heating.

9. A welder for welding together two parts at a groove therebetween comprising:

welding means for welding together said two parts at a weld spot in said groove;

heating means for heating a heat spot adjacent said weld spot in said groove simultaneously and independently of said welding means;

a frame for aligning said welding and heating means along said groove to form a weld bead therealong; and feeding means for feeding a filler into said groove at said weld spot to form said weld bead, wherein said welding means include a welding torch and said heating means include a heating torch offset from said welding torch for preferentially heating said heat spot to control temperature difference with said weld spot to determine microstructure of said weld bead, said feeding means being aligned with said heating torch for preheating said filler prior to being melted at said weld spot.

10. A welder according to claim 9 wherein said welding torch comprises an electrical arc torch.

11. A welder according to claim 9 wherein said welding torch comprises a laser torch.

12. A welder according to claim 9 wherein said heating torch comprises a laser torch.

13. A welder for welding together two parts at a groove therebetween comprising:

welding means for welding together said two parts at a weld spot in said groove;

heating means for heating a heat spot adjacent said weld spot in said groove simultaneously and independently of said welding means;

a frame for aligning said welding and heating means along said groove to form a weld bead therealong; and feeding means for feeding a filler into said groove at said weld spot to form said weld bead; wherein:

said welding means include a welding to torch; and said heating means include a heating torch offset from said welding torch for preferentially heating said heat spot to control temperature difference with said weld spot to determine microstructure of said weld bead, said heating, torch being offset to trail said welding torch along, said groove to postheat said weld bead.

14. A welder according to claim 13 wherein:

said heating means include a postheat heating torch offset from said welding torch to trail said welding torch along said groove to postheat said weld bead, said heating means thereby further controlling temperature difference with said weld spot to determine microstructure of said weld bead.

15. A welder according to claim 13 wherein said welding torch comprises an electrical arc torch.

16. A welder according to claim 13 wherein said welding torch comprises a laser torch.

17. A welder according to claim 13 wherein said heating torch comprises a laser torch.

* * * * *